US009930399B2

(12) United States Patent
Howard

(10) Patent No.: US 9,930,399 B2
(45) Date of Patent: Mar. 27, 2018

(54) DIGITAL VIDEO RECORDER AS A CONTENT DELIVERY SERVER

(71) Applicant: AT&T INTELLECTUAL PROPERTY I, L.P., Atlanta, GA (US)

(72) Inventor: Daren Howard, Covington, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 14/976,223

(22) Filed: Dec. 21, 2015

(65) Prior Publication Data
US 2017/0180790 A1  Jun. 22, 2017

(51) Int. Cl.
H04N 7/20        (2006.01)
H04N 21/436      (2011.01)
H04L 29/08       (2006.01)
H04W 4/06        (2009.01)
H04N 21/4147     (2011.01)
H04N 21/4363     (2011.01)
(Continued)

(52) U.S. Cl.
CPC ....... H04N 21/43622 (2013.01); H04L 67/06 (2013.01); H04L 67/2842 (2013.01); H04N 21/2747 (2013.01); H04N 21/4147 (2013.01); H04N 21/437 (2013.01); H04N 21/4331 (2013.01); H04N 21/43615 (2013.01); H04N 21/43637 (2013.01); H04W 4/06 (2013.01)

(58) Field of Classification Search
CPC combination set(s) only.
See application file for complete search history.

(56) References Cited

U.S. PATENT DOCUMENTS 6,901,604 B1   5/2005   Kiraly
8,464,298 B1   6/2013   Dagman
(Continued)

FOREIGN PATENT DOCUMENTS

WO   2006055920   5/2006

OTHER PUBLICATIONS

Cooley, "The NBN may adopt a peer-to-peer model for content distribution," The Australan, theaustralian.com.au, Jul. 19, 2012, document of 2 pages. http://www.theaustralian.com.au/business/technology/the-nbn-may-adopt-a-peer-to-peer-model-for-content-distribution/story-fn4iyzsr-1226429609785.
(Continued)

Primary Examiner — Alexander Gee
(74) Attorney, Agent, or Firm — Akerman LLP; Michael K. Dixon; Mammen (Roy) P. Zachariah, Jr.

(57) ABSTRACT

A system for enabling a digital video recorder to serve as a content delivery server is disclosed. In particular, the system may include deploying a content delivery server at a cell site, which may be provided a content package from a satellite or fiber network. Additionally, the system may include deploying, at a customer premises, a digital video recorder that may serve as a content delivery server and may be equipped for wireless communication. The content package may be transmitted from the content delivery server of the cell site to the digital video recorder. Upon receiving a request for content from a user device, the digital video recorder may transmit the requested content to the user device if the digital video recorder is in range of the user device. Otherwise, the content delivery server at the cell site may transmit the requested content to the user device.

20 Claims, 4 Drawing Sheets

(51) Int. Cl.
*H04N 21/437* (2011.01)
*H04N 21/433* (2011.01)
*H04N 21/2747* (2011.01)

(56) References Cited

U.S. PATENT DOCUMENTS

| | | | |
|---|---|---|---|
| 8,627,387 B2 | 1/2014 | Georgescu | |
| 8,713,605 B2* | 4/2014 | Van Hoff | G06F 3/0481 |
| | | | 725/37 |
| 8,713,623 B2 | 4/2014 | Brooks | |
| 8,726,327 B2 | 5/2014 | Miao et al. | |
| 8,806,555 B2 | 8/2014 | Hayhurst | |
| 8,824,464 B2 | 9/2014 | Nadeau et al. | |
| 8,839,314 B2 | 9/2014 | Kortum et al. | |
| 8,904,463 B2 | 12/2014 | Shankar et al. | |
| 8,949,915 B2 | 2/2015 | Ramakrishnan et al. | |
| 8,966,553 B2 | 2/2015 | Chen et al. | |
| 9,021,542 B2 | 4/2015 | Picucci | |
| 9,065,906 B2 | 6/2015 | Dankberg et al. | |
| 9,077,855 B2 | 7/2015 | Riley et al. | |
| 9,124,911 B2 | 9/2015 | Rothschild et al. | |
| 2002/0154892 A1 | 10/2002 | Hoshen et al. | |
| 2003/0158958 A1 | 8/2003 | Chiu | |
| 2003/0204856 A1 | 10/2003 | Buxton | |
| 2006/0075082 A1 | 4/2006 | Haga et al. | |
| 2006/0282856 A1* | 12/2006 | Errico | G06F 17/30035 |
| | | | 725/46 |
| 2008/0005030 A1* | 1/2008 | Schlarb | G06F 21/10 |
| | | | 705/57 |
| 2009/0097825 A1 | 4/2009 | Harris | |
| 2009/0217332 A1* | 8/2009 | Hindle | H04N 5/782 |
| | | | 725/109 |
| 2009/0235319 A1 | 9/2009 | Mao et al. | |
| 2010/0100911 A1* | 4/2010 | Ramakrishnan | H04N 7/17318 |
| | | | 725/92 |
| 2010/0146569 A1 | 6/2010 | Janardhan et al. | |
| 2011/0229105 A1* | 9/2011 | Khan | H04N 5/765 |
| | | | 386/200 |
| 2012/0278476 A1* | 11/2012 | Agrawal | G06Q 50/01 |
| | | | 709/224 |
| 2013/0007191 A1* | 1/2013 | Klappert | H04N 21/23109 |
| | | | 709/217 |
| 2013/0251338 A1* | 9/2013 | Abecassis | H04N 5/445 |
| | | | 386/241 |
| 2013/0347016 A1* | 12/2013 | Rowe | H04N 21/252 |
| | | | 725/13 |
| 2014/0089448 A1* | 3/2014 | Geffner | H04L 67/2842 |
| | | | 709/213 |
| 2014/0157327 A1* | 6/2014 | Roberts | H04L 67/10 |
| | | | 725/61 |
| 2014/0344861 A1* | 11/2014 | Berner | H04N 21/4826 |
| | | | 725/46 |
| 2014/0373078 A1* | 12/2014 | Ross | H04N 21/418 |
| | | | 725/87 |
| 2015/0264408 A1 | 9/2015 | Hao et al. | |

OTHER PUBLICATIONS

Huang et al., "Peer-Assisted VoD: Making Internet Video Distribution Cheap," IPTPS. 2007, document of 6 pages. http://svn.tribler.org/abc/branches/leo/dataset/preferences/iptps-2007/HuangLiRoss.pdf.

Dyaberi et al., "Storage optimization for a peer-to-peer video-on-demand network," Proceedings of the first annual ACM SIGMM conference on Multimedia systems, ACM, 2010, document of 12 pages. http://www.cs.uccs.edu/~cs525/vod/dyaberiP2PVoDICM2010.pdf.

Han et al., "Hulu in the neighborhood," Communication Systems and Networks (COMSNETS), 2011 Third International Conference, IEEE, 2011, document of 10 pages. http://www.cs.cmu.edu/afs/cs/Web/People/dga/papers/han-comsnets2011.pdf.

* cited by examiner

DIGITAL VIDEO RECORDER AS A CONTENT DELIVERY SERVER

FIELD OF THE INVENTION

The present application relates to technologies for digital video recorders, content distribution, fiber networks, and satellite networks, and more particularly, to a system and method for enabling a digital video recorder to serve as a content delivery server.

BACKGROUND

In today's society, users are increasingly utilizing network and other service providers to gain access to the Internet, request and access various types of content, access software applications, access software services, and perform a variety of other tasks and functions. As an example, an increasing number of users are subscribing to internet protocol television (IPTV) services provided by service providers in order to access various types of media content, such as, but not limited to, television shows, movies, and programs. Users of such services often take advantage of media processing devices, such as digital video recorders, to record and store various types of media content provided by various content providers. For example, if a particular program of interest is airing at a time that the user cannot view in real-time, the user may set the digital video recorder to record the program of interest so that the user can view the recorded program of interest at another time chosen by the user. Additionally, users are increasingly utilizing mobile devices, such as smartphones and tablets, to access media content, such as through mobile communication networks. Such media content is often delivered to the mobile devices by streaming the media content from content delivery network servers across mobile network backhaul facilities and local cellular networks to the mobile devices.

While current digital video recording technologies and content delivery technologies provide a variety of features and functions that enhance users' experiences with media content, there is still room to substantially enhance and improve digital video recording technologies and content delivery technologies. For example, due to increasing media content demands, current technologies often require streaming large media content streams across backhaul facilities and cellular networks to the mobile devices requesting the streams in an inefficient manner. Based on the foregoing, digital video recording technologies and content delivery technologies may be modified so as to provide enhanced quality-of-service for users, improved functionality, and additional options relating to the use of such technologies. Such enhancements and improvements to digital video recording technologies and content delivery technologies may provide for improved customer satisfaction and increased revenue for content and service providers.

SUMMARY

Systems and accompanying methods for utilizing content delivery servers positioned at cell sites to deliver content and enabling digital video recorders to serve as content delivery servers are disclosed. In current versions of content delivery networks, when devices request content, a unique stream of the content is provided by one or more content delivery network servers across a backhaul network, then to a cell site, and then out to each individual device requesting the content. While current processes are useful in providing content to various devices, current processes often do not utilize network resources in an efficient manner. In order to increase the efficient use of network resources, the systems and methods disclosed herein may serve to extend content delivery networks and functions to the far edges of a network, such as a wireless network. In order to accomplish the foregoing, the systems and methods may include deploying content delivery servers at cell sites, and deploying digital video recorders, such as long-term-evolution-enabled and/or Wi-Fi-enabled digital video recorders, at a user's premises. The content delivery servers positioned at the cell sites and the digital video recorders may be provided with content packages including, but not limited to, standard definition content, high definition content, 4K content, software updates, mobile version of programming, other content, or any combination thereof. The content delivered to the content delivery servers positioned at the cell sites and the digital video recorders may be received from satellite networks, fiber networks, or other mobile backhauls to position content as close to users as possible.

After the content packages are delivered to the content delivery servers positioned at the cell sites and the digital video recorders, a user device may request content included within the content packages. The requested content may be delivered directly to the user device from the content delivery servers at the cell sites and/or the digital video recorders. As a result, the functionality provided by the systems and methods limit the amount of traffic required to traverse a backhaul network and/or core network associated with a service provider. In certain embodiments, if content is cached on the digital video recorders, the digital video recorders may serve files directly to users in their homes as well as to users in neighboring locations that have devices in range of the digital video recorders, such as via a local network. In such a scenario, this would eliminate the need for users to stream the files from the local cell site, and would further reduce traffic traversing over the local mobile network. This, in turn, frees up network resources of the mobile network to provide other types of services to the users.

In certain embodiments, new trending content, such as content identified by content providers and/or big data, may be transmitted to the content delivery servers positioned at the cell site and then to the digital video recorders via broadcast. This may eliminate and/or reduce the need for transmitting individual data streams to each device, while prepositioning content to deliver the best possible service to customers. By placing content delivery server functionality within a digital video recorder, the systems and methods enable staged content to be streamed to mobile devices and to fixed home devices (e.g. televisions) without the need for streaming traffic across mobile backhaul and/or a cellular network. This allows for a better user experience by providing the best possible quality of playback for content and the fastest possible access to other data files across local network facilities instead of across a congested mobile network.

In one embodiment, a system for enabling a digital video recorder to serve as a content delivery server is disclosed. The system may include a memory that stores instructions and a processor that executes the instructions to perform various operations of the system. The system may perform an operation that includes receiving, at a first content delivery server positioned at a cell site, a first content package comprising a plurality of content. In certain embodiments, the first content package may be received from a satellite network and/or a fiber network. The system may then perform an operation that includes delivering, to a digital video recorder serving as a second content delivery server, the first content package comprising the plurality of the content. The digital video recorder may be equipped for wireless communication, such as by incorporating a wireless transceiver into the digital video recorder. The system may perform an operation that includes receiving, from a user device, a request for first content. The system may proceed to perform an operation that includes determining if the first content is included in the first content package. If the first content is determined to be included in the first content package, the system may perform, in response to the request, an operation that includes transmitting the first content from the digital video recorder to the user device via a local wireless network associated with the user device.

In another embodiment, a method for enabling a digital video recorder to serve as a content delivery server is disclosed. The method may include utilizing a memory that stores instructions, and a processor that executes the instructions to perform the various functions of the method. The method may include receiving, at a first content delivery server positioned at a cell site, a first content package including a plurality of content. The first content package may be received from a satellite network and/or a fiber network. Additionally, the method may include transmitting the first content package including the plurality of the content to a digital video recorder serving as a second content delivery server. Furthermore, the method may include receiving a request for first content from a user device. Moreover, the method may include determining if the first content is included in the first content package. Finally, the method may include transmitting, in response to the request and if the first content is determined to be included in the first content package, the first content from the digital video recorder to the user device via a local wireless network.

According to yet another embodiment, a computer-readable device having instructions for enabling a digital video recorder to serve as a content delivery server is provided. The computer instructions, which when loaded and executed by a processor, may cause the processor to perform operations including: receiving, at a first content delivery server positioned at a cell site, a first content package comprising a plurality of content, wherein the first content package is received from a satellite network; delivering, to a digital video recorder serving as a second content delivery server, the first content package comprising the plurality of the content; receiving, from a user device, a first request for first content; determining if the first content is included in the first content package; and transmitting, in response to the first request and if the first content is determined to be included in the first content package, the first content from the digital video recorder to the user device via a local wireless network.

These and other features of the systems and methods for enabling a digital video recorder to serve as a content delivery server are described in the following detailed description, drawings, and appended claims.

DETAILED DESCRIPTION OF THE INVENTION

Figure 1:
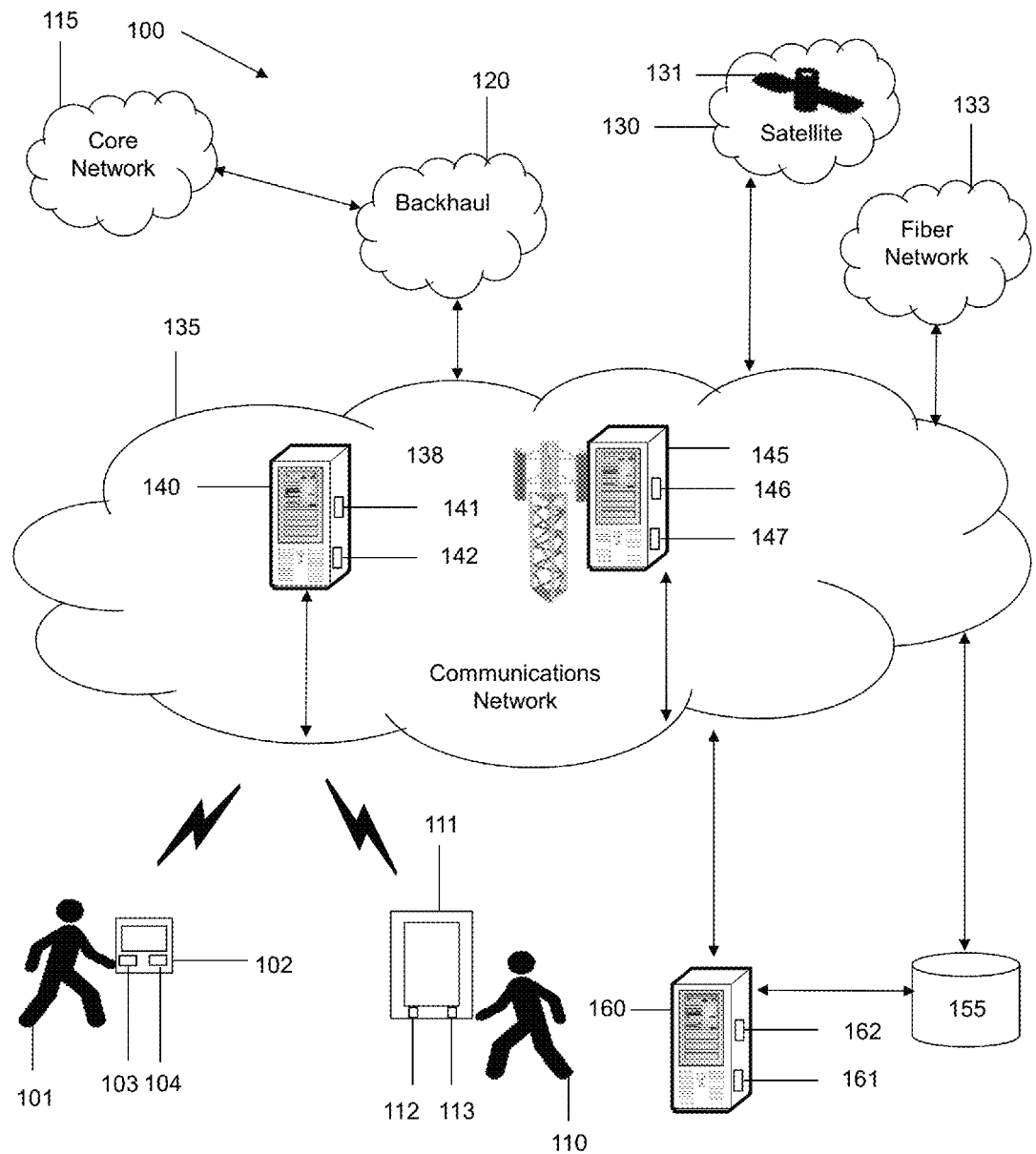
FIG. 1 is a schematic diagram of a system for utilizing content delivery servers positioned at a cell site to deliver content according to an embodiment of the present disclosure.

Systems 100, 200 and accompanying methods for utilizing content delivery servers positioned at cell sites 138 to deliver content and enabling digital video recorders 165 to serve as content delivery servers are disclosed. The systems 100, 200 and methods disclosed herein may serve to extend content delivery networks and functionality to the far edges of a network, such as a wireless network. In order to accomplish the foregoing, the systems 100, 200 and methods may include deploying content delivery servers (e.g. servers 140, 145) at cell sites 138, and deploying digital video recorders 165, such as long-term-evolution-enabled and/or Wi-Fi-enabled digital video recorders, at a user's premises. The content delivery servers positioned at the cell sites 185 and the digital video recorders 165 may be provided with content packages including, but not limited to, standard definition content, high definition content, 4K content, software updates, mobile version of programming, other content, or any combination thereof. The content delivered to the content delivery servers positioned at the cell sites 138 and the digital video recorders 165 may be received from satellite networks 130, fiber networks 133, or other mobile backhauls to position content as close to the users as possible.

Once the content packages are delivered to the content delivery servers positioned at the cell sites 138 and the digital video recorders 165, a user device (e.g. first user device 102) may request content included within the content packages. The requested content may be delivered directly to the user device from the content delivery servers at the cell sites 138 and/or the digital video recorders 165. As a result, the functionality provided by the systems 100, 200 and methods may limit the amount of traffic required to traverse a backhaul network 120 and/or core network 115 associated with a service provider. In certain embodiments, if content is cached on the digital video recorders 165, the digital video recorders 165 may serve files directly to users in their homes as well as to users in neighboring locations that have devices in range of the digital video recorders, such as via a local network 175. In such a scenario, this would eliminate the need for users to stream the files from the local cell site 138, and would further reduce traffic traversing over the local mobile network associated with the cell site 138. This, in turn, frees up network resources of the mobile network to provide other types of services to the users.

In certain embodiments, new trending content, such as content identified by content providers and/or big data, may be transmitted to the content delivery servers positioned at the cell site 138 and then to the digital video recorders 165 via broadcast. This may eliminate and/or reduce the need for transmitting individual data streams to each device, while prepositioning content to deliver the best possible service to customers. By placing content delivery server functionality within a digital video recorder 165, the systems 100, 200 and methods enable staged content to be streamed to mobile devices and to fixed home devices (e.g. televisions) without the need for streaming traffic across mobile backhaul and/or a cellular network. This allows for a better user experience by providing the best possible quality of playback for content and the fastest possible access to other data files across local network facilities instead of across a congested mobile network.

As shown in FIG. 1, a system 100 that utilizes content delivery servers (e.g. servers 140, 145) positioned at a cell site 138 to deliver content and to provide content delivery services is disclosed. The system 100 may be configured to support, but is not limited to supporting, IPTV services, digital video recorder services, cloud computing services, content delivery services, IP Multimedia Subsystem (IMS) services, satellite services, fiber services, telephone services, voice-over-internet protocol services (VoIP), voice-over-long-term-evolution (VoLTE) services, LTE services, software as a service (SaaS) applications, gaming applications and services, social media applications and services, operations management applications and services, productivity applications and services, mobile applications and services, and any other computing applications and services. The system may include a first user 101 that may utilize a first user device 102 to access content, data, and services, or to perform a variety of other functions. As an example, the first user 101 may utilize first user device 102 to transmit signals to the system 100 to request various types of media content, store media content on the digital video recorder 165, control the digital video recorder 165, control the media device 170, or any combination thereof. Media content may include, but is not limited to, audio content, video content, web content, text content, any type of content, or any combination thereof. In certain embodiments, the media content may be static content, dynamic content, or a combination of static and dynamic content.

In certain embodiments, the first user 101 may be a subscriber of a service provider that controls communications network 135. The first user device 102 may include a memory 103 that includes instructions, and a processor 104 that executes the instructions from the memory 103 to perform the various operations that are performed by the first user device 102. In certain embodiments, the processor 104 may be hardware, software, or a combination thereof. In certain embodiments, the first user device 102 may be a computer, a laptop, a set-top-box, a tablet device, a phablet, a server, a mobile device, a smartphone, a smart watch, or any other type of computing device. Illustratively, the first user device 102 is shown as a smartphone device in FIGS. 1-2. In certain embodiments, the first user device 102 may communicate with the digital video recorder 165 of system 200 by utilizing infrared radiation, Bluetooth connectivity, ZigBee, Z-Wave, any type of wireless protocol, radio technologies, or any combination thereof.

The system may also include a second user 110 that may utilize a second user device 111 to also access content, data, and services, and to perform a variety of other functions. For example, the second user device 111 may be utilized by the second user 110 to transmit signals to request various types of content, services, and data provided by content and service providers associated with the communications network 135 or any other network in the system 100. In certain embodiments, the second user 110 may be a subscriber of a service provider that controls communications network 135. The second user device 111 may include a memory 112 that includes instructions, and a processor 113 that executes the instructions from the memory 112 to perform the various operations that are performed by the second user device 111. In certain embodiments, the processor 113 may be hardware, software, or a combination thereof. Similar to the first user device 102, in certain embodiments, the second user device 111 may be a computer, a laptop, a tablet device, a phablet, a server, a mobile device, a smartphone, a smart watch, or any other type of computing device. Illustratively, the second user device 111 is shown as a tablet device in FIGS. 1-2. In certain embodiments, the second user device 111 may communicate with the digital video recorder 165 by utilizing infrared radiation, Bluetooth connectivity, ZigBee, Z-Wave, any type of wireless protocol, radio technologies, or any combination thereof.

In certain embodiments, the first user device 102 and the second user device 111 may have any number of software applications and/or application services stored and/or accessible thereon. For example, the first and second user devices 102, 111 may include cloud-based applications, VoIP applications, other types of phone-based applications, product-ordering applications, business applications, e-commerce applications, media streaming applications, content-based applications, media-editing applications, database applications, gaming applications, internet-based applications, browser applications, mobile applications, service-based applications, productivity applications, video applications, music applications, social media applications, any other type of applications, any types of application services, or a combination thereof. In certain embodiments, the software applications and services may include one or more graphical user interfaces so as to enable the first and second users 101, 110 to readily interact with the software applications. The software applications and services may also be utilized by the first and second users 101, 110 to interact with the any device in the system 100, any network in the system 100, or any combination thereof. In certain embodiments, the first user device 102 and the second user device 111 may include associated telephone numbers, device identities, or any other identifiers to uniquely identify the first and second user devices 102, 111.

In certain embodiments, the first user device 102 and the second user device 111 may have corresponding device profiles. In certain embodiments, each of the devices in the system 100 (or system 200) may have its own corresponding device profile. For example, the media device 170 and the digital video recorder 165 of system 200 may have their own device profiles. Information included in a device profile may include, but is not limited to, information specifically corresponding to the first user device 102 and the second user device 111, information identifying the types of devices that the first user device 102 and the second user device 111 are, information relating to how the first user 101 utilizes the first user device 102, information relating to how the second user 110 utilizes the second user device 111, information identifying what type of services and information the first user 101 and second user 110 are authorized to access, information indicating each type of component included in the first user device 102, and the second user device 111, information identifying the processing power, storage capacity, download capabilities, upload capabilities, and content delivery services subscriptions associated with the first user device 102 and the second user device 111, any other information associated with the first user device 102, the second user device 111, or any combination thereof. The device profiles may be made accessible to any device, network, or a combination thereof, in the system 100 (or the system 200).

In addition to device profiles, the system 100 (and system 200) may also include user profiles. A user profile may be a profile corresponding to the first user 101, the second user 110, or any other user. For example, the first user's 101 profile may include information, such as, but not limited to, a name of the first user 101, the age of the first user 101, demographic information associated with the first user 101, information identifying the first user device 102 of the first user 101, the types of services, such as content delivery services, subscribed to by the first user 101, information identifying a location of the first user 101, information identifying the type of content the first user 101 likes, information identifying the types of applications that the first user 101 utilizes, information identifying media content edited by the first user 101, and any other information. The user profiles may be stored directly on the first user device 102, the second user device 111, the database 155, on any other device in the system 100, or on any combination thereof. Additionally, the user profiles may be accessible by any device in the system 100 (or system 200), any network in the system 100 (or system 200), or a combination thereof.

In addition to the including the first and second user devices 102, 111, the system 100 may also include a core network 115. The core network 115 may serve as a central backbone network of the system 100 (and system 200) that provides communication services, such as content delivery services and call services, to one or more subscribers, such as, but not limited to the first and second users 101, 110. The core network 115 may serve as the backbone for the service provider that controls communications network 135, backhaul 120, satellite network 130, fiber network 133, any other network, or any combination thereof. The core network 115 may be communicatively linked with any device and/or network in the systems 100, 200 and may include any functionality and features of a traditional core/backbone network.

The system 100 may include a backhaul 120, which may include the intermediate links between the core network 115 and other networks in the system 100 or otherwise. For example, the backhaul 120 may include intermediate links between core network 115 and communications network 135 or any other network of system 100 or system 200. The backhaul 120 may be utilized to facilitate content delivery services, calling services, accounting services, any type of services, delivery of content, or any combination thereof. The backhaul 120 may be controlled by the service provider associated with communications network 135, core network 115, any other network, or any combination thereof, and may include any of the features and functionality of a traditional backhaul 120. In traditional content delivery environments, if a user such as first user 101 requests content using first user device 102, a unique stream of the content may traverse across the backhaul 120 to the cell site 138 and then to the first user device 102. The systems and methods disclosed herein assist in alleviating the burdens on the backhaul 120 by extending the edge of the content delivery network as close to the users as possible.

Additionally, the system 100 may include a satellite network 130, which may include one or more satellites 131, to provide content delivery services and/or any other type of services. The satellite network 130 may include any features of a traditional satellite network and may be communicatively linked with any device and/or network included in the systems 100, 200. The satellites 131 of the satellite network 130 may deliver any type of content to communications network 135, local network 175 of system 200, any other network, any device in the systems 100, 200, or any combination thereof. Furthermore, the system 100 may include a fiber network 133 that includes optical fiber to provide content delivery services and/or any other type of services. The fiber network 133 may include any features of a traditional fiber network and may be communicatively linked with any device and/or network included in the systems 100, 200. The fiber network 133 may deliver any type of content to communications network 135, local network 175 of system 200, any other network, any device in the systems 100, 200, or any combination thereof.

The system 100 may also include a communications network 135. The communications network 135 of the system 100 may be configured to link each of the devices in the system 100 to one another. For example, the communications network 135 may be utilized by the first user device 102 to connect with other devices within or outside communications network 135. Additionally, the communications network 135 may be configured to transmit, generate, and receive any information and data traversing the system 100. In certain embodiments, the communications network 135 may include any number of servers, databases, or other componentry, and may be controlled by a service provider. In certain embodiments, the communications network 135 may be subscribed to by the first and second users 101, 110. The communications network 135 may also include and be connected to a radio access network, a cloud-computing network, an IMS network, a VoIP network, a VoLTE network, an LTE network, a wireless network, an Ethernet network, a fiber network, a satellite network, a broadband network, a cellular network, a private network, a cable network, the Internet, an internet protocol network, a multiprotocol label switching (MPLS) network, a content distribution network, an internet protocol television network, any network, or any combination thereof. Illustratively, servers 140, 145 are shown as being included within communications network 135. In certain embodiments, the communications network 135 may be part of a single autonomous system that is located in a particular geographic region, or be part of multiple autonomous systems that span several geographic regions.

In certain embodiments, the communications network 135 may be configured to deliver media content and services using an internet protocol suite and by utilizing packet switching. The communications network 135 may provide the ability to stream media requested by the first and second users 101, 110, provide live television services, provide for media-on-demand, or any combination thereof. In certain embodiments, the communications network 135 may include any of the components and functionality found in traditional internet protocol television networks. The communications network 135 may include one or more cell sites 138 that may be utilized to communicate with the first user device 102, the second user device 111, the digital video recorder 165 of the second system 200, any other device, or any combination thereof. Notably, the cell site 138 may have one or more content delivery servers, such as servers 140, 145, integrated directly into the cell site 138, positioned at the cell site 138, or a combination thereof. By placing the one or more content delivery servers at the cell site 138, this may greatly reduce demands on the backhaul 120 for various types of content, such as static content or largely static content. In certain embodiments, the cell site 138 may include hardware components that include any of the functional features of a radio access network. The cell site 138 may be configured for providing LTE services, other cellular services, any type of services, or any combination thereof. The cell site 138 may include any of the functionality of a base station utilized in mobile communication networks. For example, the cell site 138 may include any number of antennae, transceivers, digital signal processors, control electronics, GPS receivers, electrical power sources, radio equipment, and electronics equipment to create a cell for the communications network 135. The cell site 138 may be configured to communicate with and receive content streams from the satellite network 130, the fiber network 133, the backhaul 120, the core network 115, or any combination thereof.

Notably, the functionality of the system 100 may be supported and executed by using any combination of the servers 140, 145, and 160. The servers 140, 145, and 160 may be content delivery servers and may include any functionality associated with content delivery servers. Notably, as indicated above, the servers 140, 145 may be positioned at the cell site 138, integrated into the cell site 138 itself, or any combination thereof. In certain embodiments, the server 140 may include a memory 141 that includes instructions, and a processor 142 that executes the instructions from the memory 141 to perform various operations that are performed by the server 140. The processor 142 may be hardware, software, or a combination thereof. Similarly, the server 145 may include a memory 146 that includes instructions, and a processor 147 that executes the instructions from the memory 146 to perform the various operations that are performed by the server 145. In certain embodiments, the servers 140, 145, and 160 may be network servers, routers, gateways, computers, mobile devices or any other suitable computing device. In certain embodiments, the servers 140, 145 may be communicatively linked to the communications network 135, any network, any device in the system 100, or any combination thereof.

The database 155 of the system 100 may be utilized to store and relay information that traverses the system 100, cache content that traverses the system 100, store data about each of the devices in the system 100 and perform any other typical functions of a database. In certain embodiments, the database 155 may be connected to or reside within the communications network 135, any other network, or a combination thereof. Additionally, the database 155, in certain embodiments, may serve as a content source for stored content that may be accessed by the communication network 135 so that the communication network 135 may obtain content for the first and second users 101, 110 in an efficient and effective manner. In certain embodiments, the database 155 may serve as a central repository for content and information requested by the first and second users 101, 110. Furthermore, the database 155 may include a processor and memory or be connected to a processor and memory to perform the various operation associated with the database 155.

In certain embodiments, the database 155 may be connected to servers 140, 145, 160, cell site 138, first user device 102, second user device 111, digital video recorder 165, media device 170, or any combination thereof. The database 155 may also store information and metadata obtained from the system 100, store media content, store metadata and other information associated with the first and second users 101, 110, store user profiles associated with the first and second users 101, 110, store device profiles associated with the first user device 102, the second user device 111, the digital video recorder 165 of system 200, and media device 170 of system 200, store location information, store communications traversing the system 100, store user preferences, store information associated with any device or signal in the system 100, store information relating to patterns of usage relating to the first and second user devices 102, 111, store content packages, store static content, store software updates for updating devices in the system 100, store data files for Internet of Things devices, store mobile versions of media content, store different resolutions of media content, store service subscription information associated with content delivery services subscribed to by the first and second users 101, 110, store augmented reality content, store virtual reality content, store gaming content, store information utilized for identifying communications network 135, local network 175 of system 200, or any combination thereof, store any information traversing the system 100, or any combination thereof. Furthermore, the database 155 may be configured to process queries sent to it by any device in the system 100 (or system 200).

Operatively, the system 100 may utilize content delivery servers (e.g. servers 140, 145) positioned at a cell site 138 to deliver content as shown in the following exemplary scenario. In the example scenario, one or more content packages may be delivered to the content delivery servers (e.g. servers 140, 145) positioned at the cell site 138 of the communications network 135. The content packages may include any content including but not limited to, video content, visual content, audio content, text content, augmented reality content, virtual reality content, static content, partially static content, partially dynamic content, music content, software content, software updates, firmware updates, gaming content, news content, Internet of Things data files, data files for connected vehicles, any type of software, any type of content, any type of data files, any type of information, or any combination thereof. The content packages may be delivered to the content delivery servers positioned at the cell site 138 by the satellite network 130, the fiber network 133, any other network, or any combination thereof.

The first user 101 may request content, such as a movie, to view on the first user device 102. The request may be input via an application executing on the first user device 102 and a signal including the request may be transmitted to the cell site 138 that is in communication with the first user device 102. The system 100 may determine if the content requested by the first user 101 is included in any of the content packages that have been delivered to the content delivery servers positioned at the cell site 138. If the requested content is included in a content package delivered to the content delivery servers positioned at the cell site 138, the system 100 may cause the content delivery servers positioned at the cell site 138 to transmit the requested content directly to the first user device 102 for viewing. By directly transmitting the content from the content delivery servers positioned at the cell site 138 to the first user device 102, the system 100 limits the amount of traffic required to traverse the backhaul 120 and/or the core network 115. The backhaul 120 and/or the core network 115 resources may be utilized to focus on different tasks, such as, but not limited to, processing calls, processing accounting processes, and/or delivering content that is not cached on the content delivery servers. If the requested content is not included in the content packages stored at the content delivery servers positioned at the cell site 138, the content delivery servers positioned at the cell site 138 may obtain an additional content package including the requested content from the satellite network 130 and/or the fiber network 133. Once the additional content package is obtained, the content delivery servers positioned at the cell site 138 may transmit the requested content to the first user device 102. The second user 110 may similarly request and receive content in a similar manner as the first user 101.

Figure 2:
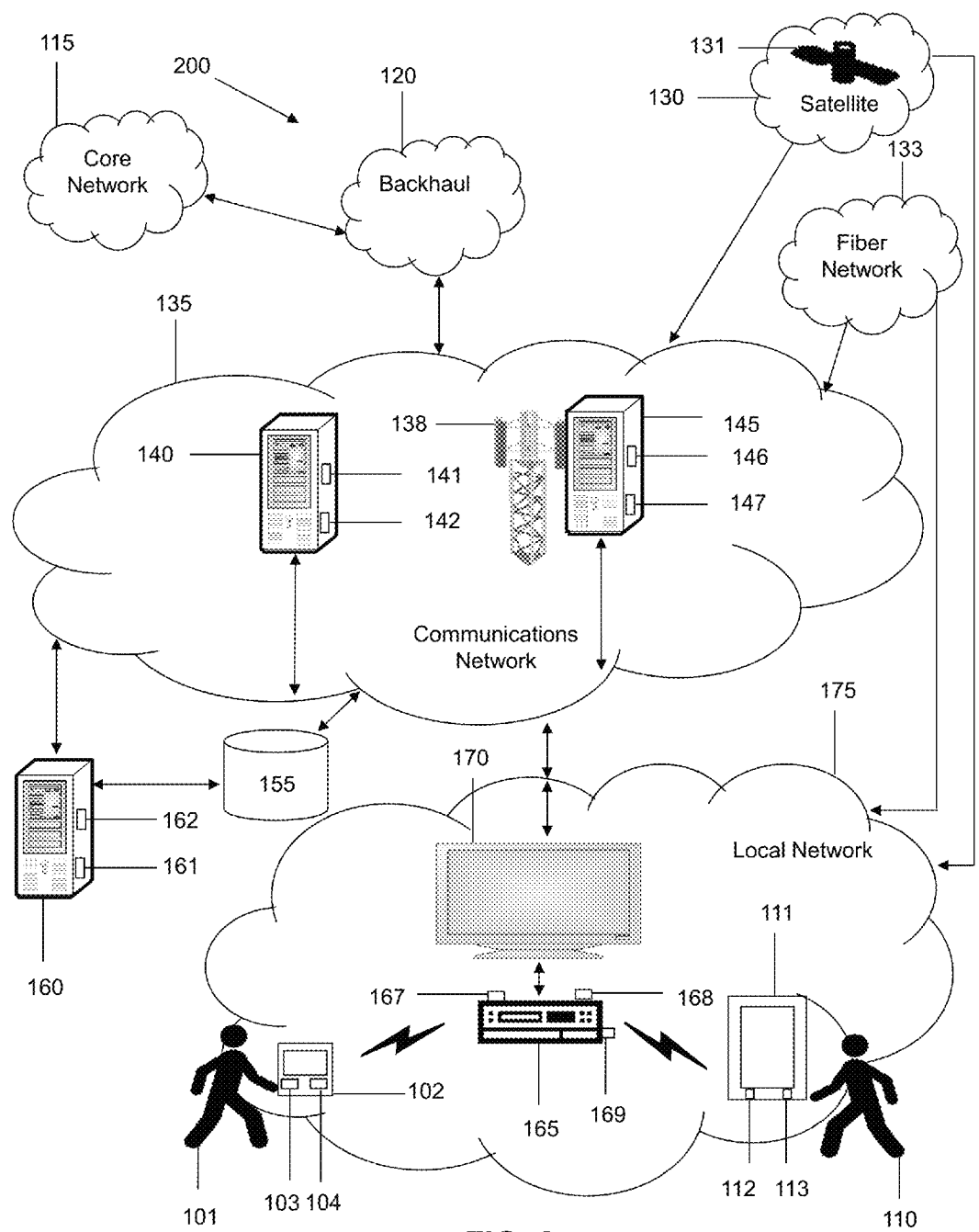
FIG. 2 is a schematic diagram of a system for enabling a digital video recorder to serve as a content delivery server according to another embodiment of the present disclosure.

As shown in FIG. 2, a system 200 for utilizing content delivery servers (e.g. servers 140, 145) positioned at a cell site 138 to deliver content and enabling a digital video recorder 165 to serve as a content delivery server is disclosed. Notably, the system 200 may include any and all of the devices, networks, components, and users of system 100. Additionally, the system 200 may include any of the features and functionality provided by system 100. In addition to including the devices, componentry, networks, and users of system 100, the system 200 may also include a digital video recorder 165, which may be a device that may be configured to record and store media content and information, access media content, perform any of the functionality of a traditional digital video recording device, or any combination thereof. The digital video recorder 165 may enable the first and second users 101, 110 to request media content, pause the playing of media content, rewind media content, fast-forward media content, and/or to perform other similar operations associated with a digital video recorder.

In certain embodiments, the digital video recorder 165 may be included within a set-top box, connected to a set-top box, included within a gateway, connected to a gateway, included within a portable media player, connected to a portable media player, or any combination thereof. In certain embodiments, the digital video recorder 165 and the media device 170 may be housed together as a single device. The digital video recorder 165 may be controlled by the first user 101 by utilizing the first user device 102 and/or any controls present on the digital video recorder 165 itself. For example, the first user 101 may control the digital video recorder 165 by utilizing any number of input devices on the first user device 102 and/or digital video recorder 165. Similarly, the second user 110 may control the digital video recorder 165 by utilizing the second user device 111 and/or any controls present on the digital video recorder 165. For example, the second user 110 may control the digital video recorder 165 by utilizing a media application of the second user device 111 that includes a user interface featuring controls for the digital video recorder 165. In certain embodiments, the service provider of the first and second users 101, 110 may control the digital video recorder 165.

The digital video recorder 165 may include a transceiver 167 for communicating with the devices in the system 100 and may include any number of antennae. Additionally, the digital video recorder 165 may be LTE/Wi-Fi-enabled or otherwise enabled for mobile communications. In certain embodiments, the digital video recorder 165 may include any necessary software and componentry for communicating with mobile devices, such as, but not limited to, first user device 102, second user device 111, the cell site 138, the servers 140, 145, the satellite network 130, the fiber network 133, or any combination thereof. The digital video recorder 165 may also include a digital video recorder media storage 168 that may be configured to store media content and data. Additionally, the digital video recorder media storage 165 may be configured to store user preferences associated with the media content, information identifying the specific subscriptions that the first and second users 101, 110 have purchased, information identifying the types of services that may be provided to the first and second users 101, 110, any other information, or any combination thereof. Furthermore, the digital video recorder media storage 168 may be configured to store instructions that may be executed by a processor 169 of the digital video recorder 165 to perform various operations that are performed by the digital video recorder 165. The processor 169 may be hardware, software, or a combination thereof. The digital video recorder 165 may also include a recording application, which may be configured to record media content based on one or more inputs received from the first user device 102, the second user device 111, or a combination thereof.

The system 200 may also include a media device 170. The media device 170 of the system 100 may be a monitor, a television, a tablet device, a computer, or any other type of device including a display that is capable of displaying media content. In certain embodiments, the media device 170 may be controlled by utilizing the first user device 102, the second user device 111, the digital video recorder 165, by utilizing controls on the media device 170 itself, or by utilizing the service provider associated with the first and second users 101, 110. The media device 170 may be configured to communicate with the digital video recorder 165, the first user device 102, the second user device 111, any other device, or any combination thereof. In certain embodiments, the media device 170 may include any number of memories configured to store instructions and processors configured to execute the instructions to perform various operations performed by the media device 170. The media device 170 may be configured to display or otherwise output media content provided by the digital video recorder 165 or by any other device in the system 100. In certain embodiments, the media device 170 may be configured to communicate with any of the devices, networks, and components of the systems 100, 200.

The system 200 may further include a local network 175. The local network may be computer network that may be utilized to interconnect the first user device 102, the second user device 111, the digital video recorder 165, the media device 170, any of the devices in the system 200, or any combination thereof, with one another. In certain embodiments, the local network 175 may be a Wi-Fi network, an Ethernet network, any type of local network, or any combination thereof. The local network may also be configured to support infrared radiation technologies, Bluetooth connectivity technologies, ZigBee technologies, Z-Wave technologies, any type of wireless protocol, radio technologies, or any combination thereof. In certain embodiments, the first user device 102 and/or the second user device 111 may only access the local network 175 upon entering valid authentication credentials, such as into one or more applications executing on the first user device 102 and/or second user device 111. In certain embodiments, the local network 175 may include any functionality an features of a traditional local area network. In further embodiments, the first and second users 101, 111 may access the local area network 175 even if they reside in different locations and/or are located in different locations. In further embodiments, the local area network 175 may be configured to communicate with any network in the systems 100, 200, any device in the systems 100, 200, or any combination thereof.

Operatively, the system 200 may enable a digital video recorder 165 to serve as a content delivery as shown in the following exemplary scenario. In the example scenario, one or more content packages may be delivered to the content delivery servers (e.g. servers 140, 145) positioned at the cell site 138 of the communications network 135. The content packages may include any content including but not limited to, video content, visual content, audio content, text content, augmented reality content, virtual reality content, static content, partially static content, partially dynamic content, music content, software content, software updates, firmware updates, gaming content, news content, Internet of Things data files, data files for connected vehicles, any type of software, any type of content, any type of data files, any type of information, or any combination thereof. The content packages may be delivered to the content delivery servers positioned at the cell site 138 from the satellite network 130, the fiber network 133, any other network, or any combination thereof. Once the content packages are delivered to the content delivery servers positioned at the cell site 138, the content delivery servers positioned at the cell site 138 and/or the cell site 138 itself may transmit one or more of the content packages to the digital video recorder 165 for storage.

The first user 101 may request content, such as a movie, to view on the first user device 102. The request may be input via an application executing on the first user device 102 and a signal including the request may be transmitted to the digital video recorder 165 and/or the cell site 138. The system 100 may determine if the content requested by the first user 101 is included in any of the content packages that have been delivered to the content delivery servers positioned at the cell site 138 and/or the digital video recorder 165. If the requested content is included in a content package delivered to the content delivery servers positioned at the cell site 138, but is not in a content package delivered to the digital video recorder 165, the system 100 may cause the content delivery servers positioned at the cell site 138 to transmit the requested content directly to the first user device 102 for viewing. If the requested content is not included in the content packages stored at the content delivery servers positioned at the cell site 138, the content delivery servers positioned at the cell site 138 may obtain an additional content package including the requested content from the satellite network 130 and/or the fiber network 133. Once the additional content package is obtained, the content delivery servers positioned at the cell site 138 may transmit the requested content to the first user device 102.

If, however, the system 100 determines that the requested content is included in a content package that was previously delivered to the digital video recorder 165, the digital video recorder 165 may directly transmit and/or stream the requested content (e.g. movie) to the first user device 102 for viewing, such as via local network 175 and/or transceiver 167. In certain embodiments, the second user 110 using second user device 111 may be located in a different location from the first user 101, but may also want to watch the same movie. If the requested content is not available on a digital video recorder belonging to the second user 101, the second user 101 may obtain the content from the digital video recorder 165 belonging to the first user. In order to do so, the second user device 111 of the second user 101 may connect with the local network 175 and receive the content directly from the digital video recorder 165 via the local network 175. In certain embodiments, the second user device 111 may directly connect with the digital video recorder 165 and receive the requested content via the transceiver 167. In certain embodiments, the requested content may be transmitted from the digital video recorder 165 of the first user 101 to the digital video recorder of the second user 110, and then the content may be transmitted from the digital video recorder of the second user 110 to the second user device 111 for viewing. In certain embodiments, the digital video recorder 165 of the first user 101 and the digital video recorder of the second user 110 may be communicatively linked to create a content delivery network that may be utilized to share content with other neighbors that are in range of the first and second users 101, 111, the local network 175, the digital video recorder 165 of the first user 101, the digital video recorder of the second user 110, or any combination thereof. By allowing content to be delivered from the digital video recorder 165, the system 200 may assist in eliminating the need for streaming content from the cell site 138 and/or the content delivery servers positioned at the cell site 138. This would further reduce traffic over the communications network 135, which frees up the communications network 135 to provide other services.

Notably, as shown in FIGS. 1-2, the systems 100, 200 may perform any of the operative functions disclosed herein by utilizing the processing capabilities of server 160, the storage capacity of the database 155, or any other component of the system 100 to perform the operative functions disclosed herein. The server 160 may include one or more processors 162 that may be configured to process any of the various functions of the system 100. The processors 162 may be software, hardware, or a combination of hardware and software. Additionally, the server 160 may also include a memory 161, which stores instructions that the processors 162 may execute to perform various operations of the system 100. For example, the server 160 may assist in processing loads handled by the various devices in the system 100, such as, but not limited to, receiving, at a content delivery server positioned at a cell site, a content package including a plurality of content; delivering, to a digital video recorder serving as a second content delivery server, the content package including the plurality of content; receiving a request for content from a user device; determining if the requested content is in the content package; determining if the digital video recorder is in range of the user device and/or a local network associated with the user device; delivering the requested content to the user device via the first content delivery server and/or the digital video recorder; and performing any other suitable operations conducted in the systems 100, 200 or otherwise. In one embodiment, multiple servers 160 may be utilized to process the functions of the systems 100, 200. The server 160 and other devices in the systems 100, 200, may utilize the database 155 for storing data about the devices in the systems 100, 200 or any other information that is associated with the systems 100, 200. In one embodiment, multiple databases 155 may be utilized to store data in the systems 100, 200.

Although FIGS. 1-2 illustrate specific example configurations of the various components of the systems 100, 200 the systems 100, 200 may include any configuration of the components, which may include using a greater or lesser number of the components. For example, the systems 100, 200 are illustratively shown as including a first user device 102, a second user device 111, a communications network 135, a cell site 138, a server 140, a server 145, a server 160, a database 155, a digital video recorder 165, a media device 170, and a local network 175. However, the systems 100, 200 may include multiple first user devices 102, multiple second user devices 111, multiple communications networks 135, multiple servers 140, multiple servers 145, multiple servers 160, multiple databases 155, multiple digital video recorders 165, multiple media devices 170, multiple local networks 175, or any number of any of the other components in the systems 100, 200. Furthermore, in certain embodiments, substantial portions of the functionality and operations of the systems 100, 200 may be performed by other networks and systems that may be connected to systems 100, 200.

Figure 3:
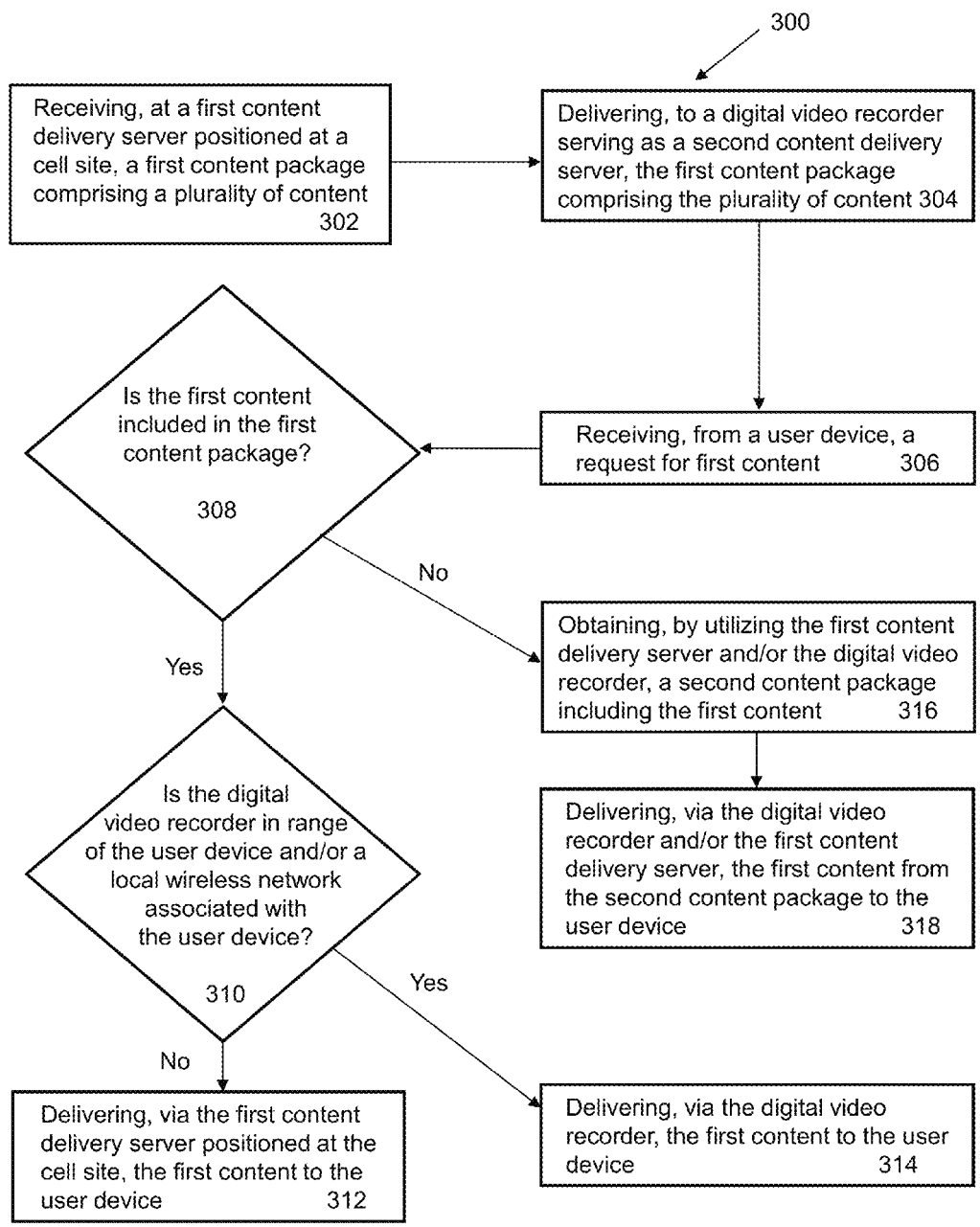
FIG. 3 is a flow diagram illustrating a sample method for utilizing content delivery servers positioned at cell sites to deliver content and enabling digital video recorders to serve as content delivery servers is disclosed according to an embodiment of the present disclosure.

As shown in FIG. 3, an exemplary method 300 for utilizing content delivery servers positioned at cell sites to deliver content and enabling digital video recorders to serve as content delivery servers is schematically illustrated, and may include, at step 302, receiving, at a first content delivery server (e.g. server 140 and/or server 145) positioned at a cell site 138, a first content package including a plurality of content. The first content delivery server may be positioned in proximity to the cell site 138, integrated into the cell site 138, or any combination thereof. The first content package may be received from a satellite network 130, a fiber network 133, another network, or a combination thereof. In certain embodiments, the receiving of the first content package may be performed by utilizing the cell site 138, the server 140, the server 145, the server 160, the communications network 135, any combination thereof, or by utilizing any other appropriate program, network, system, or device. At step 304, the method 300 may include delivering, to a digital video recorder 165 serving as a second content delivery server, the first content package including the plurality of content. The digital video recorder 165 may include a transceiver 167 for communicating with the devices in the system 100, and may be LTE/Wi-Fi-enabled or otherwise enabled for mobile communication. In certain embodiments, the delivering may be performed by utilizing the cell site 138, the server 140, the server 145, the server 160, the communications network 135, the digital video recorder 165, the local network 175, any combination thereof, or by utilizing any other appropriate program, network, system, or device.

At step 306, the method 300 may include receiving, from a user device, a request for first content. For example, the first user 101 may request the first content by utilizing an application executing on the first user device 102. The first content may be any type of content, such as, but not limited to, media content including video content, audio content, text content, any content, or any combination thereof. In this example, the first user 101 may be requesting a movie. In certain embodiments, the request may be transmitted and/or received by utilizing the first user device 102, the second user device 111, the cell site 138, the server 140, the server 145, the server 160, the communications network 135, the digital video recorder 165, the local network 175, any combination thereof, or by utilizing any other appropriate program, network, system, or device. At step 308, the method 300 may include determining if the requested first content is included in the first content package. In certain embodiments, the determining may be performed by utilizing the first user device 102, the second user device 111, the server 140, the server 145, the server 160, the communications network 135, the digital video recorder 165, the local network 175, any combination thereof, or by utilizing any other appropriate program, network, system, or device.

If the requested first content is determined to be included in the first content package, the method 300 may include, at step 310, determining if the digital video recorder 165 is in range of the user device and/or a network (e.g. local network 175 or other network) associated with the user device. Being in range of the user device and/or the network associated with the user device may mean, but is not limited to meaning, that the digital video recorder 165 is at a location that would enable the digital video recorder 165 to communicatively link with the user device and/or the network associated with the user device. In certain embodiments, the determining may be performed by utilizing the first user device 102, the second user device 111, the server 140, the server 145, the server 160, the communications network 135, the local network 175, the digital video recorder 165, any combination thereof, or by utilizing any other appropriate program, network, system, or device. If the digital video recorder 165 is not in range of the user device and/or the network associated with the user device so as to communicatively link with the user device and/or network, the method 300 may include, at step 312, delivering, to the user device, the first content included within the first content package from the first content delivery server positioned at the cell site 138. In certain embodiments, the delivery of the first content to the user device may be performed by utilizing the first user device 102, the second user device 111, the server 140, the server 145, the cell site 138, any combination thereof, or by utilizing any other appropriate program, network, system, or device.

If, however, the digital video recorder 165 is in range of the user device and/or the network associated with the user device, the method 300 may include, at step 314, delivering, via the digital video recorder 165, the first content to the user device. The first content may be delivered to the user device via a wireless or other network that the digital video recorder 165 and the user device are communicatively linked to. For example, the digital video recorder 165 may deliver the movie file to the first user device 102 via the local network 175. In certain embodiments, the first content may be delivered by utilizing the transceiver 167. In certain embodiments, the delivering may be performed by utilizing the first user device 102, the second user device 111, the digital video recorder 165, the local network 175, any combination thereof, or by utilizing any other appropriate program, network, system, or device.

If, at step 308, the requested first content is determined to not be included in the first content package, the method 300 may include, at step 316, obtaining, by utilizing the first content delivery server of the cell site 138 and/or the digital video recorder 165, a second content package that includes the first content requested by the user. The content delivery server of the cell site 138 and/or the digital video recorder 165 may obtain the second content package from the satellite network 130, the fiber network 133, any other network, or any combination thereof. In certain embodiments, the obtaining of the second content package may be performed by utilizing the cell site 138, the server 140, the server 145, the digital video recorder 165, the local network 175, any combination thereof, or by utilizing any other appropriate program, network, system, or device. Once the second content package is obtained, the method 300 may include, at step 318, delivering the first content from the second content package to the user device via the first content delivery server of the cell site 138 and/or the digital video recorder 165. In certain embodiments, the first content from the second content package may be delivered by utilizing the cell site 138, the server 140, the server 145, the digital video recorder 165, the local network 175, any combination thereof, or by utilizing any other appropriate program, network, system, or device. Notably, the method 300 may incorporate any of the functionality and features as described for the systems 100, 200 or as otherwise described herein.

Notably, the systems 100, 200 and methods disclosed herein may include additional functionality and features. For example, in certain embodiments, the systems 100, 200 and methods may include enabling local broadcasters of content to deliver live content or other media content over an LTE broadcast (or other type of broadcast) using the cell site 138 and content delivery servers positioned at the cell site 138. The cell site 138 and/or content delivery servers (e.g. servers 140, 145) may provide the content to any number of devices via LTE broadcast, such as but not limited to, first user device 102, the second user device 111, the digital video recorder 165, any other device, or any combination thereof. Such a capability may be particularly helpful during weather events (e.g. storms, snow, wind, etc.) and/or network outages that may interfere with satellite communications or other network technologies that may be typically utilized to deliver content.

In certain embodiments, the systems 100, 200 and methods may enable previously set up recordings to be downloaded to the digital video recorder 165 during non-peak hours or viewed from nearby LTE-enabled digital video recorders 165 or local content delivery network servers (e.g. servers 140, 145). For example, if inclement weather and/or network outages cause a previously set up recording for a media content file to be missed (e.g. not downloaded, downloadable, or otherwise made available), the systems 100, 200 and methods may cause the cell site 138 and/or servers 140, 145 to deliver the missed content at a later time directly to the user's digital video recorder 165. As another option, another user's LTE-enabled digital video recorder may also be utilized to transmit the content to the user's digital video recorder 165 so that the user may access the content. For example, the other user's LTE-enabled digital video recorder may directly send the content to the user's LTE-enabled digital video recorder 165. Once the content is downloaded to the user's digital video recorder 165, the content may be shared with any number of additional devices of the user (e.g. first user device 102, second user device 111, etc.), such as via local network 175. This will allow for a high-quality video experience across various mobile devices associated with the user.

The functionality and features provided by the systems 100, 200 and methods may enable enterprise customers, such as, but not limited to, content providers of various types of content, to deliver the highest quality video content to mobile customers. Additionally, the functionality and features provided by the systems 100, 200 and methods may enable backhaul 120 and other networks (e.g. core network 115) to be utilized primarily for connecting and establishing calls, conducting accounting processes, and delivering content (e.g. purely dynamic content) that may not be cached or provided by the content delivery servers positioned at the cell site 138 and/or the digital video recorder 165. As a result, the systems 100, 200 and methods allow for greatly reduced demands on the backhaul 120 and core network 115 for often used static content that may instead be provided utilizing the content delivery servers positioned at the cell site 138 and/or the digital video recorder 165. In addition to reducing demands on the backhaul 120 and core network 115, the systems 100, 200 and methods may also be utilized to reduce demands on radio networks, such as communications network 135, which includes the cell site 138 and servers 140, 145. For example, popular and/or trending content may be pre-loaded on the LTE-enabled digital video recorder 165 so that when the first user 101 requests such content on the first user device 102, the content may be directly streamed from the LTE-enabled digital video recorder 165 to the first user device 102 without having to utilize the resources of the communications network 135, the backhaul 120, and/or the core network 115.

In further embodiments, a digital video recorder 165 of the first user 101 may store and cache content. The second user 110 may request content that is stored and cached on the digital video recorder 165, such as by transmitting a request via an application executing on the second user device 111. The second user 110 may be located in a different location than the first user 101 and the digital video recorder 165. In response to the request for the content, the digital video recorder 165 of the first user 101 may transmit the content directly to the second user device 111. The content may be transmitted from the digital video recorder 165 to the second user device 111 by utilizing the transceiver 167 and/or the local network 175, which the second user device 111 may be capable of communicatively linking with. If the second user device 111 is not in communication range of the local network 175 and/or the digital video recorder 165, the requested content may be provided to the second user device 111 via broadcast from the content delivery servers positioned at the cell site 138.

In further embodiments, virtualized content delivery network software may be installed on the servers 140, 145 and the digital video recorder 165 to provide content delivery network capabilities. In certain embodiments, plug-ins utilized for gateways may be loaded onto the digital video recorders 165 to facilitate the functionality provided by the systems 100, 200, and methods. In still further embodiments, any number of digital video recorders 165 may be combined to form a content delivery network so as to distribute content to requesting devices. For example, a group of digital video recorders 165 may serve as a content delivery network to provide over-the-top (OTT) content to any number of requesting devices for a given location, such as, but not limited to, a neighborhood. The OTT content may be provided with little or no backhaul limitations and/or by negating the need to access the content via a mobile network. This would allow for the delivery of content to users even in congested areas and to users who would be limited in quality of service due to possible throttling of their connections/services. The systems 100, 200, and methods may also include providing any type of content via the cell site 138 and the digital video recorders 165. For example, such content may include, but is not limited to, augmented reality content, virtual reality content, static content, partially static content, partially dynamic content, music content, software content, software updates, firmware updates, gaming content, movie content, video content, news content, Internet of Things data files, data files for connected vehicles, any type of software, any type of content, any type of data files, any type of information, or any combination thereof.

In still further embodiments, the systems 100, 200 and methods may include transmitting content packages from the content delivery servers of the cell site 138 to the digital video recorder 165 or transmitting the content packages directly from the satellite network 130 and/or fiber network 133 to the digital video recorder 165. In certain embodiments, the primary way to feed the digital video recorders 165 with content may be via the satellite network 130, since doing so will allow for the direct delivery of the content to the digital video recorders 165 without impacting cellular network bandwidth. In certain embodiments, since the systems 100, 200 may initially receive the content from the same satellite 131 of the satellite network 130 there may be no need for the content delivery servers at the cell site 138 to retransmit the content to the digital video recorders 165. Updates and new content that are not part of the initial packet (e.g. content package) delivered via the satellite network 130 may be broadcast from the cell site 138 content delivery servers to the digital video recorder 165 in certain embodiments. As an example, the digital video recorders 165 may receive the same satellite content package that is prepackaged for delivery to the content delivery servers at the cell site 138, but trending social media content, which was not even in existence when that prepackaged content package was created, may be transmitted via cellular backhaul 120 to all cellular network content delivery servers (e.g. servers 140, 145), which would then broadcast that content to all digital video recorders 165 in range. This may allow customers to view the new content to see it with the best possible feed quality, while reducing the number of times the same content needs to be transmitted across the cellular backhaul network 120 to a single broadcast and from each cell site 138 to the digital video recorders 165 to a single broadcast.

The systems 100, 200 and methods may serve to provide the highest levels of video and data service to various types of devices, such as, but not limited to, first user device 102 and second user device 111. The functionality provided by the systems 100, 200 and methods allow for the local delivery of content designed to reduce various issues caused by capacity constraints on the backhaul 120 and/or core network 115 that impact the quality of traditional mobile experiences. Additionally, the functionality provided by the systems 100, 200 and methods provide a more efficient means to store and distribute software updates, services, content, or a combination thereof. For example, the first user device 102 may request a software update for updating software on the first user device 102 from the digital video recorder 165. Furthermore, the content delivery servers at the cell site 138 and/or the digital video recorders 165 may serve as data aggregation servers for Internet of Things devices within the range of the digital video recorders 165 and/or content delivery servers at the cell site 138. In still further embodiments, the content delivery servers at the cell site 138 and/or the digital video recorders 165 may be utilized to communicatively link with and deliver content to connected vehicles, such as drones, unmanned connected mobile objects, unmanned automobiles, or any combination thereof.

Figure 4:
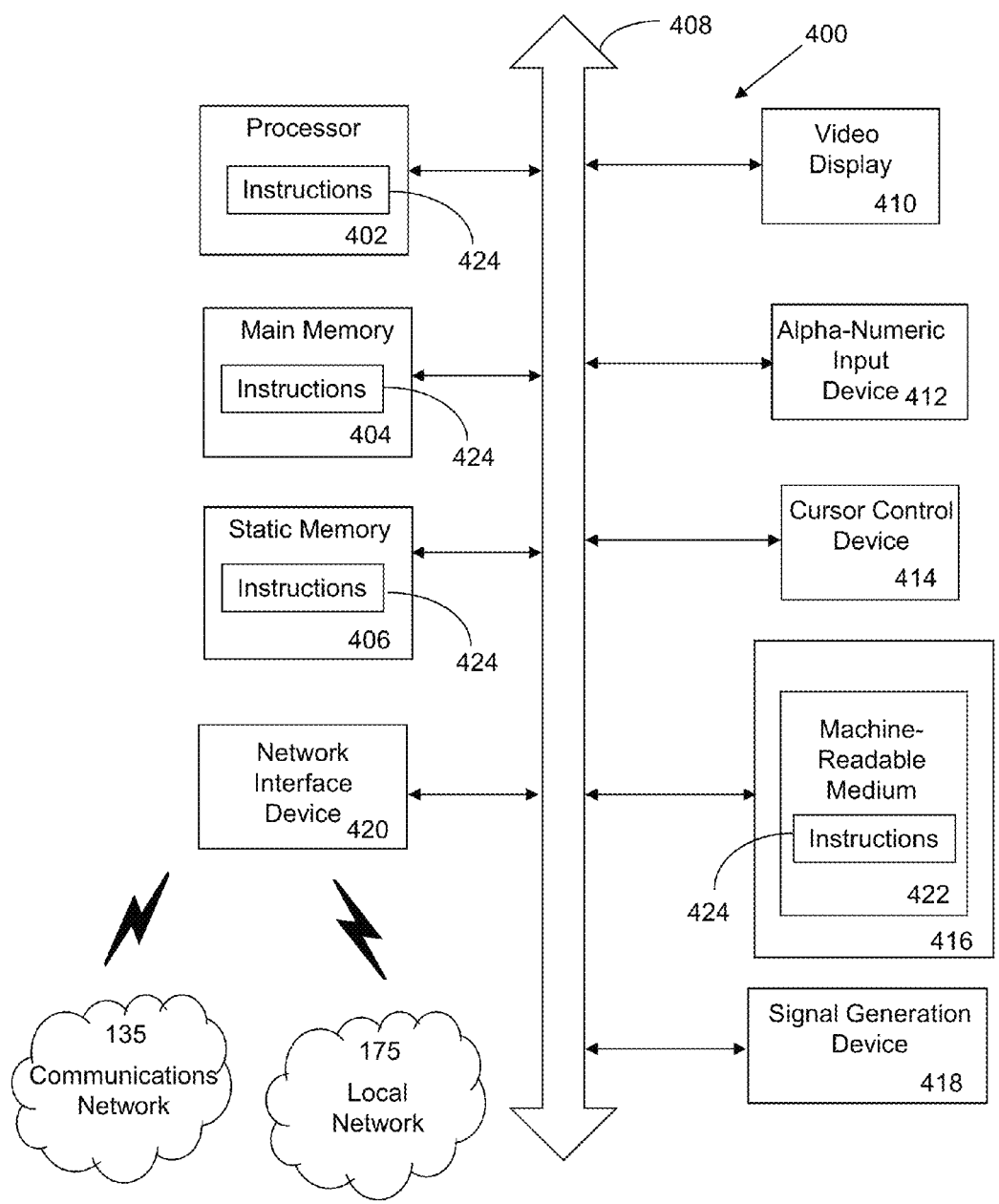
FIG. 4 is a schematic diagram of a machine in the form of a computer system within which a set of instructions, when executed, may cause the machine to perform any one or more of the methodologies or operations of the systems and methods for utilizing content delivery servers positioned at cell sites to deliver content and enabling digital video recorders to serve as content delivery servers are disclosed.

Referring now also to FIG. 4, at least a portion of the methodologies and techniques described with respect to the exemplary embodiments of the systems 100, 200 can incorporate a machine, such as, but not limited to, computer system 400, or other computing device within which a set of instructions, when executed, may cause the machine to perform any one or more of the methodologies or functions discussed above. The machine may be configured to facilitate various operations conducted by the systems 100, 200. For example, the machine may be configured to, but is not limited to, assist the systems 100, 200 by providing processing power to assist with processing loads experienced in the systems 100, 200, by providing storage capacity for storing instructions or data traversing the systems 100, 200, or by assisting with any other operations conducted by or within the systems 100, 200.

In some embodiments, the machine may operate as a standalone device. In some embodiments, the machine may be connected (e.g., using communications network 135, local network 175, another network, or a combination thereof) to and assist with operations performed by other machines and systems, such as, but not limited to, the first user device 102, the second user device 111, the cell site 138, the server 140, the server 145, the database 155, the server 160, the digital video recorder 165, the media device 170, or any combination thereof. The machine may be connected with any component in the systems 100, 200. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 400 may include a processor 402 (e.g., a central processing unit (CPU), a graphics processing unit (GPU, or both), a main memory 404 and a static memory 406, which communicate with each other via a bus 408. The computer system 400 may further include a video display unit 410, which may be, but is not limited to, a liquid crystal display (LCD), a flat panel, a solid state display, or a cathode ray tube (CRT). The computer system 400 may include an input device 412, such as, but not limited to, a keyboard, a cursor control device 414, such as, but not limited to, a mouse, a disk drive unit 416, a signal generation device 418, such as, but not limited to, a speaker or remote control, and a network interface device 420.

The disk drive unit 416 may include a machine-readable medium 422 on which is stored one or more sets of instructions 424, such as, but not limited to, software embodying any one or more of the methodologies or functions described herein, including those methods illustrated above. The instructions 424 may also reside, completely or at least partially, within the main memory 404, the static memory 406, or within the processor 402, or a combination thereof, during execution thereof by the computer system 400. The main memory 404 and the processor 402 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 422 containing instructions 424 so that a device connected to the communications network 135, the local network 175, another network, or a combination thereof, can send or receive voice, video or data, and to communicate over the communications network 135, the local network 175, another network, or a combination thereof, using the instructions. The instructions 424 may further be transmitted or received over the communications network 135, the local network 175, another network, or a combination thereof, via the network interface device 420.

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device, or "computer-readable device" shall accordingly be taken to include, but not be limited to: memory devices, solid-state memories such as a memory card or other package that houses one or more read-only (non-volatile) memories, random access memories, or other rewritable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

I claim:

1. A system, comprising:
a memory that stores instructions; and
a processor that executes the instructions to perform operations, the operations comprising:
receiving, at a first content delivery server integrated directly into a cell site, a first content package comprising a plurality of content, wherein the first content package is received from a satellite network;
delivering, to a first digital video recorder of a first user serving as a second content delivery server, the first content package comprising the plurality of the content, wherein the first digital video recorder is equipped for wireless communication;
receiving, from a first user device, a first request for first content;
determining if the first content is included in the first content package;
transmitting, in response to the first request and if the first content is determined to be included in the first content package, the first content from the first digital video recorder to the first user device via a local wireless network associated with the first user device and via a transceiver of the first digital video recorder;
receiving, at the first digital video recorder and directly from a second digital video recorder of a second user, a second request for the first content originating from a second user device communicatively linked to the second digital video recorder, wherein the first digital video recorder is located at a first customer premises that is different from a second customer premises at which the second digital video recorder is located;
forming, after receiving the second request for the first content, a content delivery network directly between the first digital video recorder of the first user and the second digital video recorder of the second user;
transmitting, directly via the transceiver of the first digital video recorder of the first user and via the content delivery network, the first content to the second digital video recorder of the second user; and
sharing the first content with other digital video recorders in communication range of the transceiver of the first digital video recorder and a transceiver of the second digital video recorder.

2. The system of claim 1, wherein the operations further comprise determining if the first digital video recorder is in range of the local wireless network associated with the first user device.

3. The system of claim 2, wherein the operations further comprise transmitting, to the first user device, the first content from the first content delivery server positioned at the cell site if the first digital video recorder is not in range of the local wireless network.

4. The system of claim 1, wherein the operations further comprise transmitting, in response to the first request, the first content to the first user device without transmitting the first content over a backhaul network.

5. The system of claim 1, wherein the operations further comprise delivering the first content package to the first digital video recorder via a broadcast made by the first content delivery server positioned at the cell site.

6. The system of claim 1, wherein the operations further comprise obtaining, if the first content is determined to not be included in the first content package, a second content package comprising the first content, wherein the second content package is obtained by the first content delivery server from the satellite network.

7. The system of claim 1, wherein the operations further comprise identifying second content that is trending among a plurality of users.

8. The system of claim 7, wherein the operations further comprise receiving, at the first content delivery server positioned at the cell site, a second content package comprising the second content.

9. The system of claim 8, wherein the operations further comprise delivering, to the first digital video recorder serving as the second content delivery server, the second content package comprising the second content via a broadcast.

10. The system of claim 1, wherein the operations further comprise receiving, from a third user device communicatively linked to the first digital video recorder, a third request for the first content from a third user.

11. The system of claim 10, wherein the operations further comprise transmitting, in response to the third request, the first content from the first digital video recorder to the third user device.

12. The system of claim 1, wherein the operations further comprise delivering, to the first digital video recorder, a software update for updating software of the first user device, wherein the software update is delivered to the first digital video recorder from the first content delivery server positioned at the cell site.

13. The system of claim 12, wherein the operations further comprise transmitting, from the first digital video recorder, the software update to the first user device via the local wireless network.

14. A method, comprising:
receiving, at a first content delivery server integrated directly into a cell site, a first content package comprising a plurality of content, wherein the first content package is received from a satellite network;
transmitting, to a first digital video recorder of a first user serving as a second content delivery server, the first content package comprising the plurality of the content;
receiving, from a first user device, a request for first content;
determining, by utilizing instructions from a memory that are executed by a processor, if the first content is included in the first content package;
transmitting, in response to the request and if the first content is determined to be included in the first content package, the first content from the first digital video recorder to the first user device via a local wireless network and via a transceiver of the first digital video recorder;
receiving, at the first digital video recorder and directly from a second digital video recorder of a second user, a second request for the first content originating from a second user device communicatively linked to the second digital video recorder, wherein the first digital video recorder is located at a first customer premises that is different from a second customer premises at which the second digital video recorder is located;
forming, after receiving the second request for the first content, a content delivery network directly between the first digital video recorder of the first user and the second digital video recorder of the second user;
transmitting, directly via the transceiver of the first digital video recorder of the first user and via the content delivery network, the first content to the second digital video recorder of the second user; and
sharing the first content with other digital video recorders in communication range of the transceiver of the first digital video recorder and a transceiver of the second digital video recorder.

15. The method of claim 14, further comprising determining if the first digital video recorder is in range of the local wireless network associated with the first user device.

16. The method of claim 15, further comprising transmitting, to the first user device, the first content from the first content delivery server positioned at the cell site if the first digital video recorder is not in range of the local wireless network.

17. The method of claim 14, further comprising enabling the first digital video recorder serving as the second content delivery server to serve as an aggregation point for an internet of things data file.

18. The method of claim 14, further comprising receiving, at the first content delivery server positioned at the cell site, a second content package, wherein the second content package is received from a fiber network.

19. The method of claim 14, further comprising delivering the first content package to the first digital video recorder via a broadcast made by the first content delivery server positioned at the cell site.

20. A computer-readable device comprising instructions, which when executed by a processor, cause the processor to perform operations comprising:
receiving, at a first content delivery server integrated directly into a cell site, a first content package comprising a plurality of content, wherein the first content package is received from a satellite network;
delivering, to a first digital video recorder of a first user serving as a second content delivery server, the first content package comprising the plurality of the content;
receiving, from a first user device, a request for first content;
determining if the first content is included in the first content package; and
transmitting, in response to the request and if the first content is determined to be included in the first content package, the first content from the first digital video recorder to the first user device via a local wireless network and via a transceiver of the first digital video recorder;
receiving, at the first digital video recorder and directly from a second digital video recorder of a second user, a second request for the first content originating from a second user device communicatively linked to the second digital video recorder, wherein the first digital video recorder is located at a first customer premises that is different from a second customer premises at which the second digital video recorder is located;
forming, after receiving the second request for the first content, a content delivery network directly between the first digital video recorder of the first user and the second digital video recorder of the second user;
transmitting, directly via the transceiver of the first digital video recorder of the first user and via the content delivery network, the first content to the second digital video recorder of the second user; and
sharing the first content with other digital video recorders in communication range of the transceiver of the first digital video recorder and a transceiver of the second digital video recorder.

* * * * *